United States Patent Office 3,515,566
Patented June 2, 1970

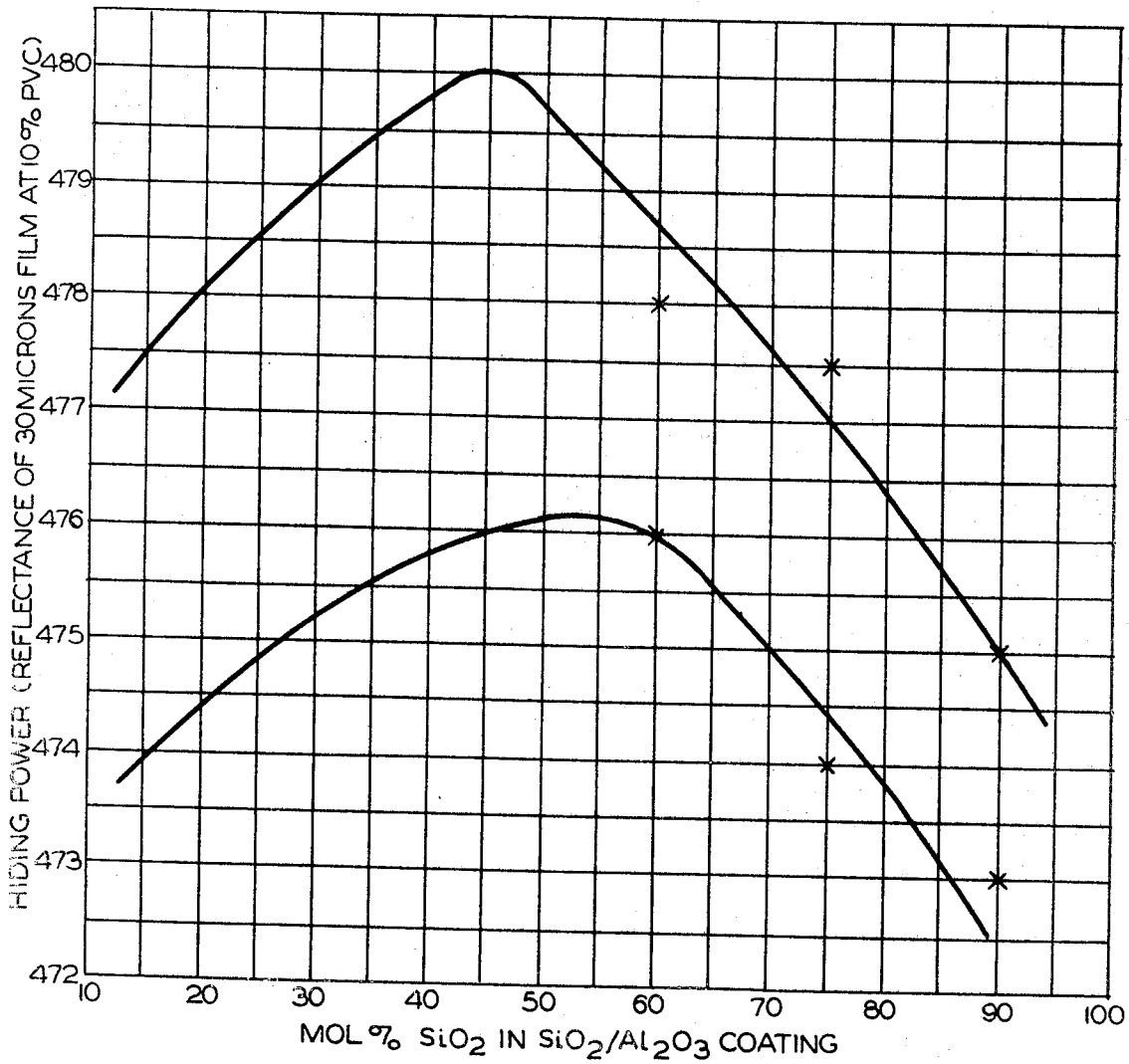

3,515,566
PROCESS FOR PRODUCING COATED TITANIUM DIOXIDE PIGMENT
John Robert Moody, Umbogintwini, Natal, Republic of South Africa, and Gerald Lederer, Stockton-on-Tees, England, assignors to British Titan Products Company Limited, Billingham, England, a corporation of the United Kingdom
Continuation-in-part of application Ser. No. 332,988, Nov. 19, 1963. This application June 26, 1967, Ser. No. 648,832
Claims priority, application Great Britain, Nov. 20, 1962, 43,846/62
Int. Cl. C09c 1/36, 3/00
U.S. Cl. 106—300                    7 Claims

ABSTRACT OF THE DISCLOSURE

Titanium dioxide pigments have been improved by having applied thereto various hydrous oxides such as the hydrous oxides of silicon, aluminum or titanium. Such coatings have been found to have certain defects apparently arising from the manner in which the coatings are applied. It has now been found that coatings of any of the above hydrous oxides or of zirconium or cerium may be advantageously applied to titanium dioxide pigment in a two-step coating process. In this process the titanium dioxide is suspended in an aqueous solution of a water-soluble salt corresponding to the hydrous oxide coating to be applied. The hydrous oxide is then precipitated onto the suspended particles. Without separating the first coated suspended particles from the suspension, additional amounts of the water-soluble salts are added to the suspension and a second precipitation of hydrous oxide is effected. The resulting product is significantly superior to pigment having a single coating of the same quantity of the same hydrous oxides.

CROSS-REFERENCE TO RELATED APPLICATIONS

This application is a continuation-in-part of U.S. application Ser. No. 332,988, filed Nov. 19, 1963 and now abandoned. Applicants claim priority from British application Ser. No. 43,846, filed Nov. 20, 1962 in Great Britain.

The present invention relates to processes for the production of titanium dioxide pigments of improved durability.

It is known to coat titanium dioxide pigments after calcination with various hydrous oxides, for example, hydrous oxides of silicon and/or aluminum and/or titanium, and to subject the coated pigments, either before or after drying, to various classification and/or milling and/or grinding processes.

The paints produced from such pigments may not be as durable as desired, particularly with regard to their stability when exposed to light in the ultraviolet range, for example, sunlight. In these circumstances, the pigments may give rise to manifestations of breakdown of the media in which the pigments are contained. These manifestations may, for example, occur in surface coating compositions, plastics, rubbers and other pigmented materials. Among such manifestations are chalking and loss of gloss.

It is an object of the present invention to produce titanium dioxide pigments of improved durability so as to prevent or reduce the undesirable effects mentioned above.

Accordingly, the present invention is a process for treating titanium dioxide pigment comprising forming a suspension of the pigment in an aqueous solution of at least one compound selected from the group consisting of the water-soluble salts of silicon, aluminum, titanium, cerium and zirconium; effecting a first coating by precipitating upon the suspended pigment from the solution hydrous oxides corresponding to said selected compound or compounds; adding additional amounts of said selected compound or compounds to said suspension; and again precipitating upon the pigment from the solution hydrous oxide corresponding to said selected compound or compounds.

By the term "hydrous oxide" is meant hydrous oxide of the metal or metalloid. It includes a plurality of hydrous oxides. Moreover, the hydrous oxide of the first coating need not be the same as that of the second coating insofar as the relative quantities of the different selected hydrous oxides are concerned or insofar as art-recognized coating compounds other than the hydrous oxide of the selected compounds are concerned. However, both first and second coatings should contain the same species of hydrous oxides of the selected compounds.

The pigment after the first coating is referred to herein as "coated pigment" and after the second coating as "doubly coated pigment."

The titanium dioxide pigment treated may be either an anatase or a rutile pigment. If a rutile pigment is treated it is preferred that at least 90% and preferably at least 95% of the titanium dioxide is in the form of rutile. The chemical method of manufacturing the titanium dioxide pigment is not critical to the practice of the present invention. Thus the present process is applicable to titanium dioxide pigment produced by the well known conventional sulfate and chloride processes, as well as to products produced by the somewhat less known and possibly less conventional processes. The pigment is produced at a temperature of at least 700° C., before being doubly coated by the process of the present invention.

When the process of the present invention is carried out, the titanium dioxide pigment is normally suspended in water with vigorous stirring, preferably in the presence of a dispersing agent, e.g., sodium silicate, sodium hexametaphosphate, sodium polyphosphate or sodium hydroxide, to insure deflocculation.

To the resulting suspension may be added the desired compound or compounds, e.g., the water-soluble salts of aluminum and/or titanium and/or cerium and/or zirconium and/or silicon, for example, aluminum sulfate and/or titanium sulfate (which may be prepared together according to British specification No. 884,811) and/or cerium sulfate and/or zirconium sulfate and/or sodium silicate (which may also have been used as a dispersing agent).

If the compounds incorporated in the suspension are water-soluble metal salts, the hydrous metal oxide may be precipitated upon the pigment by adding to the suspension an alkali, for example, sodium carbonate or sodium hydroxide, since the normal metal salts, for example, the sulfates of the metals normally to be used for coating, are acid in reaction and are water-soluble only in solutions having a pH value substantially below 7.

Where a metalloid-containing compound (such as sodium silicate which is alkaline in reaction) is present in the pigment suspension, at least some of it appears to be adsorbed onto the pigment and the addition of the metal salts which have an acid reaction may result in the precipitation of additional hydrous oxide of the metalloid on the pigment. When alkali is then added the hydrous metal oxides are precipitated on the pigment, although it is possible that some of the hydrous metal oxides, for example, some titania and zirconia, may be precipitated before alkali is added.

Examples of amounts of the hydrous oxide or oxides which may suitably be precipitated onto the pigment in the first coating are of the order of 0.1% to 5% by weight (based on the weight of pigment) and more particularly, are: alumina 0.2% to 5%, preferably 0.5% to 2.5%; titania 0.2% to 5%, preferably 0.3% to 2%; zirconia 0.3% to 5%, preferably 0.5% to 1.5%; ceria 0.1% to 2%, preferably 0.1% to 0.5%; and silica 0.1% to 2.5%, preferably 0.1% to 0.5%.

After the first coating, additional compound or compounds containing the metal or metalloid are added to the suspension. The corresponding hydrous oxides of the added compounds are then precipitated, for example, by a method similar to that used for precipitating the first coating.

Amounts of hydrous oxide precipitated during the second coating procedure are preferably, but not necessarily, similar to those precipitated during the first coating procedure.

It is preferred that, when both coatings have been effected, the total coating of the doubly coated pigment should consist of hydrous oxides of aluminium and titanium and possibly also hydrous oxide of silicon. Coating with hydrous oxide of zirconium may replace the coating with the hydrous oxide of titanium if desired, but this is not preferred.

After the double coating process of the present invention, the pigment may be recovered and treated by methods previously used for the recovery of titanium dioxide pigment after the single wet coating treatment of the prior art. For example, the doubly coated pigment may be subjected to hydro-classification, filtration, washing, drying, grinding and/or milling and/or fluid energy milling and/or air classification and bagging.

Additionally, before or during the recovery of the doubly coated pigment, as described above, it may be subjected to other coating treatments as desired. For example, it may be recoated again with inorganic coatings or it may be subjected to treatments with organic materials. The inorganic coatings may be as described above or otherwise; thus a coating with a phosphate, for example, aluminium phosphate, may be effected. The organic materials may include polyols, for example, trimethylolpropane or pentaerythritol, or olefine oxides, for example, ethylene oxide which may be applied as described and claimed in our British Pat. No. 943,287. Other organic coatings may be applied, for example, coatings of primary, secondary or tertiary amines and their derivatives such as triethanolamine or its salts with mineral acids; epoxy resins and other resins used in the paint industry; anionic, cationic or nonionic surface-active agents; carboxylic acids such as oleic acid and lauric acid; soaps and other esters of carboxylic acids; and silanes, including polysiloxanes.

After being doubly coated by the process of the present invention and after being coated with other inorganic coatings, if such have been applied, the pigment may be subjected to a heat treatment. Thus, it may be subjected to a second heating to a temperature up to about 800° C., preferably 700° C. to 800° C.

The doubly coated pigment of the invention may receive further coating after the second heating mentioned above; such further coating may be of hydrous metal oxide and/or hydrous metalloid oxide.

The following examples show methods of carrying out the process of the present invention.

Example 1

An aqueous suspension of rutile pigment (98.5% of the titanium dioxide being in the rutile form) was formed by dispersing 220 g. of pigment in 1 liter of water in the presence of 0.7 g. of sodium hexametaphosphate, "Calgon" (sodium polyphosphate might alternatively have been used).

To this suspension was added 60 ml. of an aqueous acidic solution containing 3.5 g. of aluminium oxide (as sulfate) and 2.6 g. of titanium oxide (as sulfate) followed by 15 ml. of an aqueous solution containing 1.1 g. of silica (as sodium silicate). The pH of the mixture was then adjusted to a value of pH of 7.5 with sodium carbonate solution.

During adjustment of the pH value, the mixture was stirred and the hydrous oxides of silicon, aluminium and titanium were precipitated upon the pigment so as to form the first coating.

When the first coating had been formed, another 60 ml. of the aqueous acidic solution of aluminium sulfate and titanium sulfate were added (thus rendering the mixture acidic once more) and another 15 ml. of the aqueous solution of sodium silicate were added. The pH of the mixture was again adjusted to a value of 7.5 by the addition of sodium carbonate solution. The second coating was thus formed.

The mixture was filtered to separate the doubly coated pigment and the latter was washed and dried at 105° C. The dried pigment (45 g.) was ball milled for 16 hours in the presence of glass beads with a linseed oil-modified alkyd resin and 21 g. of the white spirit. After milling, 63 g. of the linseed oil-modified alkyd resin were added to the mixture together with lead and cobalt driers and the resulting paint was uniformly applied to a stainless steel panel.

A paint was made using rutile pigment to which the same amounts of hydrous oxides of silicon, aluminium and titanium had been applied in a single coating and this paint was applied to a second stainless steel panel in a similar manner.

After paint films had been aged for seven days, they were exposed in a Marr Weatherometer and the rate of decomposition of the paint films was determined at regular intervals by removing the panels from the Weatherometer, washing their surfaces with a dilute detergent solution, drying the panel and weighing to measure the weight loss of the panel.

The weight losses in mg./cm.$^2$ were as in Table I.

TABLE I

| Time of exposure (hrs.) | 500 | 770 | 980 | 1,500 | 2,000 |
|---|---|---|---|---|---|
| Double coated pigment | 0.16 | 0.19 | 0.22 | 0.28 | 0.34 |
| Single coated pigment | 0.19 | 0.24 | 0.28 | 0.34 | 0.42 |

Example 2

The process of Example 1 was repeated, except that in the formation of each coating there was used 30 ml. of an aqueous acidic solution containing 1.75 g. of aluminium oxide (as sulfate) and 1.3 g. of titanium oxide (as sulfate) followed by 7.5 ml. of an aqueous solution containing 0.6 g. of silica (as sodium silicate).

A first paint was made from the product and applied to a stainless steel panel as in Example 1.

A second paint was made and applied to a second stainless steel panel as in Example 1, the same amounts of hydrous oxides of silicon, aluminium and titanium as in the first paint having been applied in a single coating to the pigment.

The weight losses in mg./cm.$^2$ after 2000 hours were:

Double coated pigment _____ 0.43
Single coated pigment _____ 0.46

The examples were carried out at different times and the exposure conditions differed from one example to another. Comparison of the results of the different examples is therefore not possible. The valid comparison is that of the different results in the same example.

In addition to the foregoing desirable properties, the compositions produced in accordance with the present invention exhibit superior hiding power as well as durability to those compositions in which the coating composition is applied in a single precipitation step. In the tests which follow, the aggregate of silica and alumina was constant but the relative proportions of silica and alumina in the coating were varied between 15% silica, 85% alumina and 90% silica, 10% alumina. In both instances the pigment particles had the same amount of coating, the only difference being that the material referred to as "double coated" was prepared in accordance with the teachings of the present invention, whereas the materials identified as "single coated" were prepared in a similar manner except that the entire coating was precipitated at one time.

The hiding power of the resulting pigments is estimated by incorporating the pigment in a simple paint at a pigment volume concentration of 10% and thereafter applying the paints to a number of glass surfaces by spinning to obtain a number of paint films having a thickness of as near 30 microns as possible. The reflectance of the paint films after drying is then estimated by a Harrison reflectometer when the glass is placed over a black tile and the results are correlated with the reflectance from a surface upon which finely divided magnesium oxide has been precipitated (the latter is traditionally taken to equal 100% reflectance and is given a value for purposes of this test of 600 units). The readings obtained for the test samples are then interpolated to obtain an exact reflectance for films of 30 microns in thickness.

FIG. 1 shows graphically the results of the above tests. As will be observed, the hiding power of the double coated material was quite superior to that of the single coated material.

It is particularly surprising to find that the double coated materials of the present invention are, from a practical standpoint, about as durable and have approximately the same hiding power as materials which have been double coated with separation and drying of the product between coating steps. As is known in the art, the drying of such materials coated with hydrous metal oxides provides an irreversible dehydration which forms a sort of shell about the particle. Where there has been a drying step in between such coating step, separate, distinct coatings or shells are evident. Since the process of the present invention produces only a single outer dried shell, it is indeed, surprising to find that the properties of the material are almost as good as the double shelled material and far better than might have been predicted.

What is claimed is:

1. In the process of coating titanium dioxide pigment particles with hydrous oxide of at least one member selected from the group consisting of aluminum, titanium, cerium, zirconium and silicon in which there is formed a suspension of said pigment particles in aqueous solution of water-soluble compounds of said selected member and hydrous oxide of said selected member is precipitated from said solution onto said suspended particles, the improvement which comprises effecting said coating in a plurality of precipitation steps without removal of said pigment from suspension between precipitation steps, sufficient amounts of said water-soluble compounds being dissolved in said solution between said precipitation steps to provide in said solution the selected member for the succeeding precipitation step, the amount of hydrous oxide of each member precipitated being in the range of 0.1% to 5% by weight of the titanium dioxide pigment in each coating step.

2. A process in accordance with claim 1 in which the amount of hydrous oxide of each metal precipitated is in the range of 0.1% to 2.5% by weight of the titanium dioxide pigment in each coating step.

3. A process in accordance with claim 1 in which the coating is effected in two precipitation steps, and in which the suspending solution prior to each precipitation step contains dissolved therein sufficient compounds of aluminium, titanium, and silicon to provide from each precipitation a coating consisting of 0.1% to 5% by weight of hydrous aluminium oxide, 0.1% to 5% by weight of hydrous titanium oxide, and 0.1% to 2.5% by weight of hydrous silicon oxide based on the weight of titanium oxide pigment.

4. A process in accordance with claim 1 wherein the finally coated product is separated from the suspension and heated to an elevated temperature up to about 800° C.

5. A process in accordance with claim 3 wherein the finally coated product is separated from the suspension and heated to an elevated temperature up to about 800° C.

6. A process in accordance with claim 4 comprising the further step of coating the product of claim 4 with additional hydrous oxide of a member selected from the group consisting of aluminum, titanium, cerium, zirconium and silicon.

7. A process in accordance with claim 5 comprising the further step of coating the product of claim 5 with additional hydrous oxide of a member selected from the group consisting of aluminum, titanium, cerium, zirconium and silicon.

References Cited

UNITED STATES PATENTS

| | | | |
|---|---|---|---|
| 2,218,704 | 10/1940 | Erskine | 106—300 |
| 2,671,031 | 3/1954 | Whately | 106—300 |
| 3,035,966 | 5/1962 | Siuta | 106—300 |
| 3,141,788 | 7/1964 | Whately | 106—300 |
| 3,146,119 | 8/1964 | Ritter | 106—300 |
| 3,203,818 | 8/1965 | Rechmann et al. | 106—300 |
| 3,251,705 | 5/1966 | Rieck et al. | 106—300 |

TOBIAS E. LEVOW, Primary Examiner

H. M. S. SNEED, Assistant Examiner

U.S. Cl. X.R.

106—308